United States Patent [19]

Wilkes

[11] 3,986,957

[45] Oct. 19, 1976

[54] APPARATUS FOR TREATING A LIQUID

[75] Inventor: Anthony John Wilkes, Forest Row, England

[73] Assignee: Vortex S.A., Luxemburg-Stadt, Luxemburg

[22] Filed: Dec. 23, 1974

[21] Appl. No.: 535,371

[30] Foreign Application Priority Data

Dec. 10, 1973 United Kingdom ............... 57236/73

[52] U.S. Cl. ................................ 210/150; 210/205; 259/2; 259/60; 261/119 R

[51] Int. Cl.² ............................................ B01D 1/04

[58] Field of Search ........... 209/144, 211; 210/73 R, 210/74, 84, 150, 198 R, 199, 205, 221 R, 253, 255, 512 M, 513; 259/2, 60; 261/112, 119 R, 123; 239/17, 20, 102, 499

[56] References Cited

UNITED STATES PATENTS

| | | | |
|---|---|---|---|
| 1,660,687 | 2/1928 | Stebbins | 209/144 |
| 2,119,478 | 5/1938 | Whiton, Jr. | 209/144 |
| 2,356,530 | 8/1944 | Pflock | 261/112 X |
| 3,415,373 | 12/1968 | Pink et al. | 209/211 X |
| 3,656,619 | 4/1972 | Ryan et al. | 210/512 M |
| 3,761,228 | 9/1973 | Kaartinen | 261/112 X |
| 3,948,771 | 4/1976 | Bielefeldt | 210/512 M |

FOREIGN PATENTS OR APPLICATIONS

| | | | |
|---|---|---|---|
| 575,697 | 8/1924 | France | 261/119 R |
| 663,892 | 7/1938 | Germany | 210/521 |

*Primary Examiner*—Thomas G. Wyse
*Assistant Examiner*—Robert G. Mukai
*Attorney, Agent, or Firm*—Edwin E. Greigg

[57] ABSTRACT

An apparatus for treating fluid provides a main flow path for fluid. The apparatus includes a plurality of pairs of basins arranged along the main flow path which define a series of enlargements and constrictions. Each pair of basins is constituted by a basin on each side of the main flow path opposite one another, both basins being in fluid communication with the main flow path. The walls and floors of the basins may be flat or may be curved or have some other configuration. The size of the pairs of basins may vary from one end of the flow path to the other. In operation, liquid flowing through the apparatus executes an oscillatory motion about a median longitudinal axis defined by the flow path.

15 Claims, 13 Drawing Figures

APPARATUS FOR TREATING A LIQUID

BACKGROUND OF THE INVENTION

This invention relates to an apparatus for treating a liquid. The present invention relates more particularly to an apparatus for treating a liquid whereby the quality and characteristics of the liquid can be improved or an aesthetic effect achieved.

The published work of Dipl. Ing. Th. Schwenk, of the "Institut Fur Stromungswissenschaften" of 7881, Herrischeid-Lochmatt, Kreis Waldshut, Germany is regarded as work of fundamental value in this field. The effect of influencing liquid flow behavior can be demonstrated by the drop-picture method of T. Schwenk, described in "Bewegungsformen des Wassers" by Theodor Schwenk, published 1967 by Verlag Freies, Geistesleben G.m.b.H., Stuttgart, West Germany. In this specification, the phrase "treating a liquid" is used to mean any one or more of (a) mixing a liquid with another liquid (b) dispersing a solid material in a liquid (c) increasing or decreasing the quantity of dissolved gas in a liquid (d) introducing trace elements into a liquid, (e) influencing flow behavior of the liquid to render it more suitable for employment in industrial and quasi-industrial processes and (f) achieving an aesthetic effect.

"Industrial process" in this context is intended to include factory farming processes using liquids, organic and biodynamic farming processes using liquids, and processes whereby liquids whose flow behavior has been modified or influenced can be used to enhance or depress the reactivity of catalysts.

SUMMARY OF THE INVENTION

It is an object of the present invention to provide an apparatus for treating a liquid which effects a change or improves a quality of the liquid, as the term is defined hereinabove.

It is yet another object of the present invention to provide an apparatus for treating a liquid which effects a change or improves the characteristics thereof.

It is yet another object of the present invention to provide an apparatus for treating a liquid which achieves an aesthetic effect.

The foregoing objects, as well as others which are to become clear from the text below, are achieved in accordance with the present invention by providing an apparatus for treating a liquid which includes means for causing a quantity of the liquid to flow along a total flow path, initially along a substantially straight line defining a mean flow direction, and means for causing at least a portion of the liquid to be diverted to one side of the straight line and then to the other side of the straight line to establish self-maintaining oscillations.

According to the present invention in somewhat more detail, there is provided an apparatus for treating a liquid as herein defined which includes means for allowing the liquid to flow for example, under gravity, along a total flow path that is shaped and arranged to cause the liquid to carry out an oscillatory motion, a portion of flow being first diverted to one side and then the other of the mean flow direction, thereby establishing self-inducing and self-maintaining oscillations in specific rhythms that can be of varying periodicity and intensity.

The flow path is usually, but need not be, downwardly sloping. It can be defined by a series of flat or generally flat surfaces at descending levels.

The liquid usually has a free surface, but in certain specific forms of the invention, a channel with its top closed or partly closed can be used.

The foregoing apparatus objects, as well as others which are to become clear from the text below, are achieved by providing an apparatus for treating a liquid which includes, as seen in top plan view, a series of enlargements and constrictions which define a total flow path for the liquid. The enlargements and constrictions are so positioned with respect to a median longitudinal axis, again as seen in top plan view, that at least a portion of the liquid will execute an oscillatory motion about the median longitudinal axis.

Also, according to the present invention, in somewhat greater detail, there is provided an apparatus for treating a liquid as herein defined which includes a sloping floor surface and wall surfaces which together define the limits of a total flow path having a general downhill gradient in the mean direction of flow and a number of basins (recesses) disposed at both sides of the mean direction of flow.

The wall surfaces may be vertical or sloping. The walls defining the basins may be integral with or separate from the member defining the floor surface. The basins are preferably arranged in pairs more or less axially symmetrically disposed in relation to the mean flow path, thus forming an element. For certain applications, one or more of the basins may have one or more holes in its base.

According to a more specific form of the invention, there is provided apparatus for treating a liquid which includes a single element or a series of elements, the element or elements defining a series of symmetrically arranged basins, each basin having a base at least about 50% of the upper surface area of which is flat and an arcuate wall and being constructed so that in conjunction with other basins it defines a flow path having a downhill gradient in the overall direction of flow and a number of bays or recesses disposed at either side of the direction of flow, thereby providing a flow path for portions of the liquid considerably longer between entry and exit of the liquid, than is provided by a straight channel. For example, such a flow path can be achieved by a concatenation of identical or dissimilar elements.

In use of a preferred form of the invention, the liquid to be treated enters at the upper end of a series of basins, and flows downwardly. A major portion of the liquid is laterally deflected to one side or the other and enters the first basin and swirls around it following a generally arcuate path under the guidance of the arcuate wall of the basin. It then reaches the main flow path as determined by the gradient and when it does so is momentarily following a path which intersects with the main flow path. The effect, on the inflowing liquid initially following the main flow path, of this mass of liquid on a collision course is to bodily deflect the former liquid laterally away from the main flow path so that upon such deflection a major portion of the flow enters an opposite basin and follows an arcuate path around it, likewise guided by the arcuate walls. This mass of liquid also completes its circuit within the basin and approaches the main flow path also on a collision course with the newly inflowing liquid. The effect is once again that the newly inflowing liquid is deflected, this time back to follow an arcuate course around the first basin. It will be seen that the cycle repeats itself and the newly inflowing liquid is alternately deflected to one side or the other of the main flow path. This oscillatory pattern of movement is herein referred to as a "lemniscatory movement" or a "lemniscatory flow."

As the flow path for most portions of the liquid is considerably lengthened, it can be expected for example that the oxygenation of water can be very much enhanced and speeded up by utilizing this method and apparatus. It has been found that thorough mixing of liquids can be carried out without the expenditure of energy other than that necessary to lift the liquids to be mixed to the upper end of the flow path as defined in this specification.

In use of another, less preferred, version of the invention, the effect of the series of symmetrically disposed basins is to introduce a pendulling movement into the liquid flow. In this specification, a "pendulling movement" is a condition of a liquid flow that occurs prior to establishment of lemniscatory flow (as herein defined) and immediately subsequent to the breakdown of lemniscatory flow. This occurs when one variable (e.g. flow rate) is varied while all the other variables are kept constant. It also may occur (as explained below) due to the influence of a preceding pair of basins on a succeeding pair of basins. The characteristic of a pendulling movement for a given combination of variables is that a major part of liquid flowing through a system of connected elements exhibits regular periodic deviations to one side and the other of the main flow path. The latter is of course the path as determined by gravity.

In its presently preferred form the apparatus according to the invention comprises a number of elements, each having an entry aperture an an exit aperture and a bottom that slopes downwardly from the former to the latter. These elements are constructed so that they can be placed in series with the exit aperture of the one element confronting and contiguous with the entry aperture of the next element in the downstream direction. Alternatively, elements can have their bases horizontal when they are mounted successively on a gradient with a drop in between each. In yet another alternative within the scope of the invention, the elements can be disposed in "tower form" one above the other. The liquid then passes from a pair of basins which may form the first element into a pair of basins forming the second element and so on. While the main flow path may be linear, it may alternatively be smoothly curved or may change direction abruptly.

In another embodiment of the invention, apparatus for treating liquids, as herein defined, is made up of a continuous channel of a specified shape. Its shape is such as to provide a generally linear main flow path connecting with arcuate recesses or basins. These basins are symmetrically arranged on either side of the main flow path. The liquid, for example water, enters the system at one end and leaves at the other, an intermittent vortex being built up at the point which remains constant.

The drawings are based on photographs of an actual system in operation, and to enable the water flow to be readily seen, many small black rectangular pieces of material suspended in and moving with the water were used. These pieces of material are drawn as small arrowheads in FIGS. 1–4 to indicate direction of movement.

DETAILED DESCRIPTION OF THE PREFERRRED EMBODIMENTS

Figure 1:
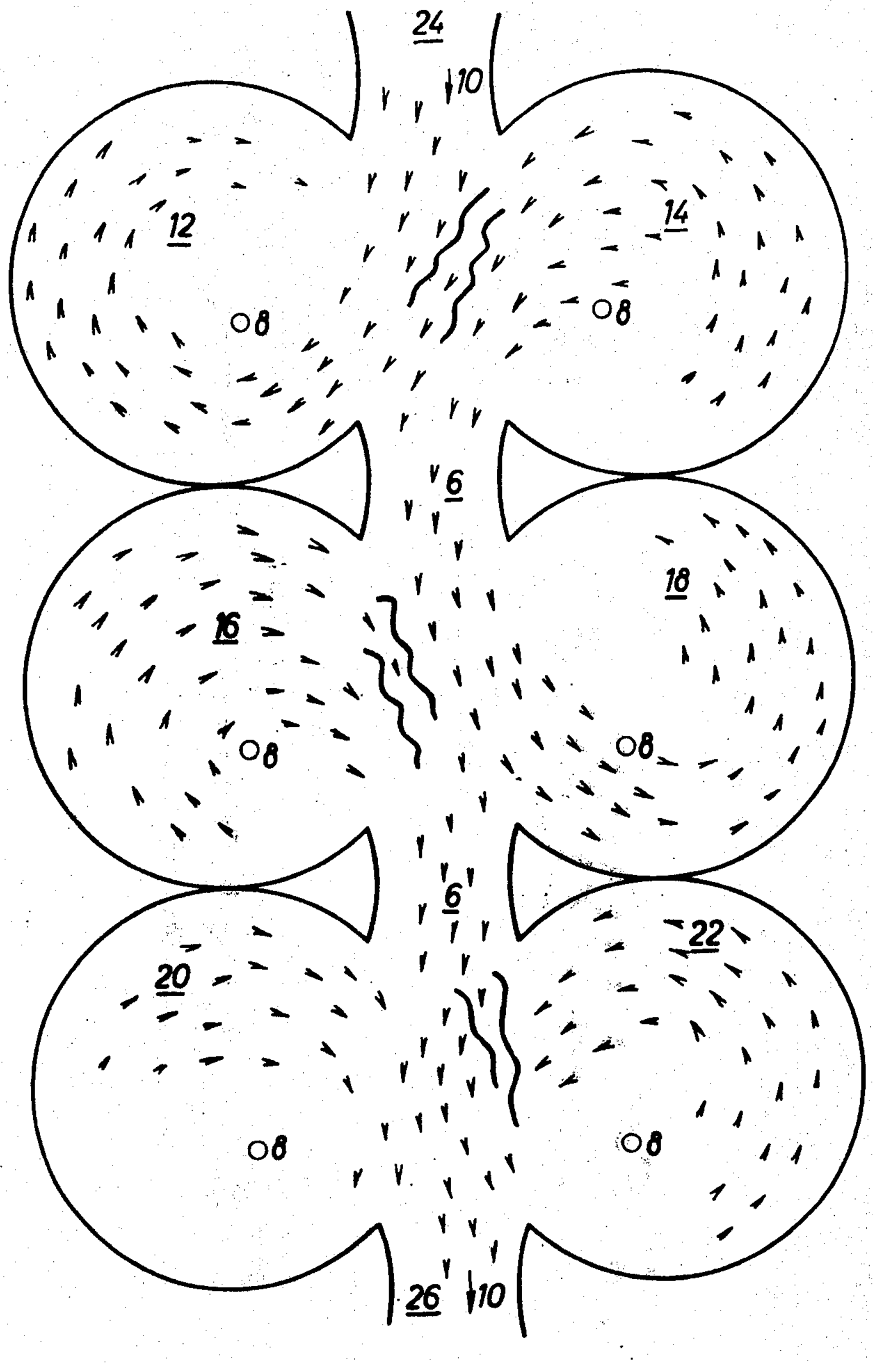
FIG. 1 is a somewhat diagrammatic, top, plan view of a first embodiment of an apparatus for treating a liquid constructed according to the present invention, one condition of water flow being shown.

As shown in FIG. 1, an apparatus for treating liquid, for purposes of illustration, shown as water having small black pieces of material therein, provides a main flow path indicated by the numerals 10. A plurality of pairs of basins 12, 14 and 16, 18 and 20, 22 are provided along the flow path 10. Each of these pairs of elements defines an element. The water enters the apparatus at one end 24 thereof and leaves from the other end 26. An intermittent vortex is built up in each of the basins 12, 14, 16, 18, 20 and 22 during operation at respective points 8, the points 8 remaining constant. FIG. 1 illustrates the condition when the bulk of the liquid flow is being directed momentarily into the basins 12 and 18 as a result of the anti-clockwise circulation out of the basin 14 and the clockwise circulation out of the basin 16, respectively. The condition in the basins 20 and 22 is a transitional condition. The movement of the bulk flow of liquid is an ever changing one. For example, at one point in time when the bulk flow of liquid is circulating in the basin 18, there may be clockwise flow in all three of the remaining basins 12, 16 and 20. This particular condition is, however, only maintained or exists for a short period of time. A further periodic relationship can be stimulated between the elements 12, 14 and 16, 18 and 20, 22; by specially designed respective communicating channels 6 between adjacent elements so that oscillations within successive elements influence one another. Thus, the oscillatory movement of liquid in a subsequent element can be brought to a collapse and be regenerated as it is influenced negatively or positively by the preceding element. In other words, by special design of the respective communicating channels 6, further oscillation can be produced which superimposes itself on an existing lemniscatory movement, as herein defined, causing the latter to break down to apparent disappearance, and to be subsequently regenerated. This appearance and disappearance of the lemniscatory movement occurs with a repeating periodicity. A pendulling movement, as herein defined, usually occurs just after breakdown and just before re-establishment of the lemniscatory movement. Also, it will be observed that each channel 6, particularly those shown in FIG. 1, has oppositely disposed curvilinear walls including a constricted throat area which induces partial entrance of the flowing liquid into the oppositely disposed basins, all of which is believed clear from this disclosure by noting the flecks in this view.

Figure 2:
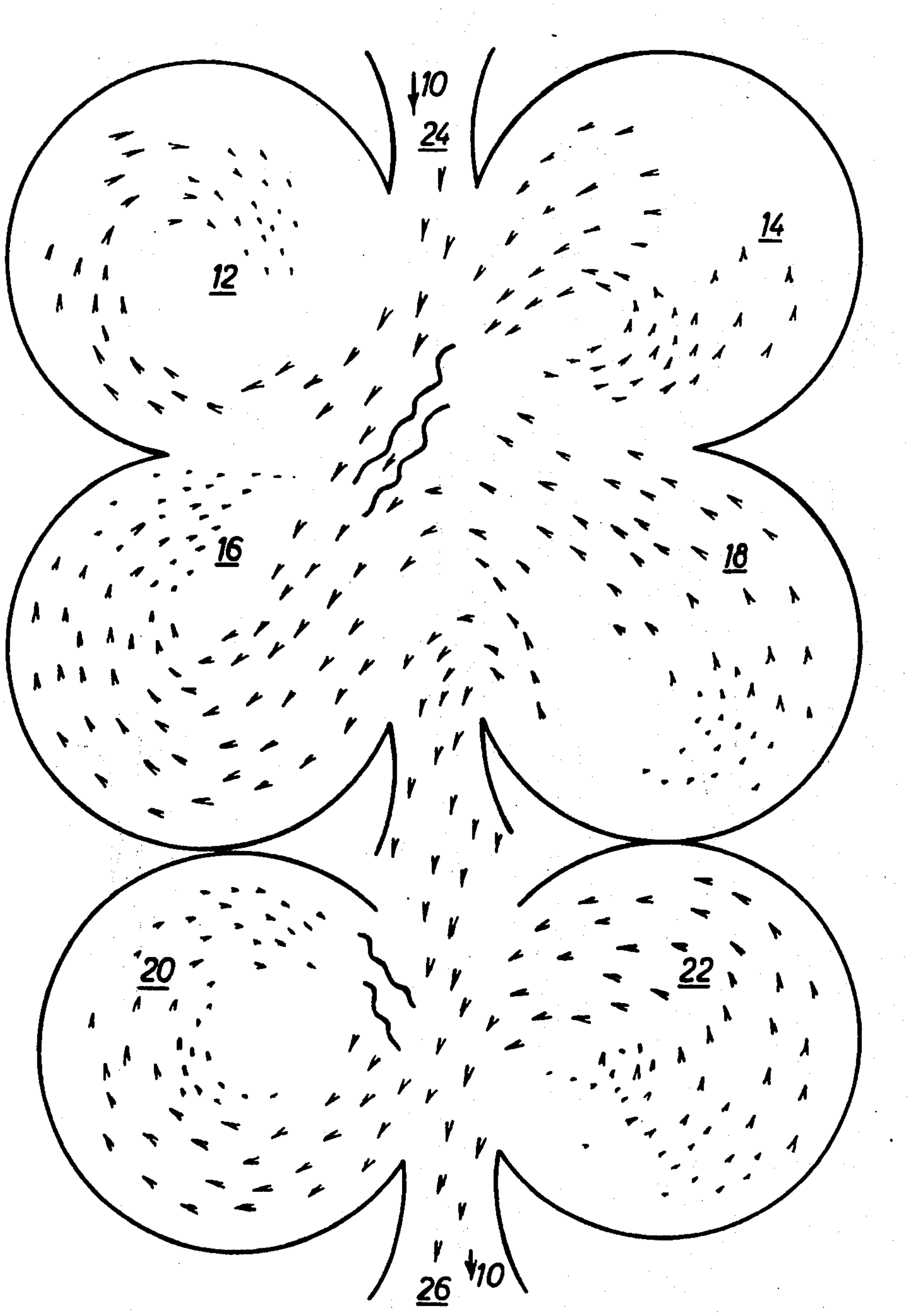
FIGS. 2–4 are diagrammatic, top, plan views of apparatuses similar to that of FIG. 1, differing conditions of water flow being shown in each Figure, and pairs of basins being combined.
Figure 3:
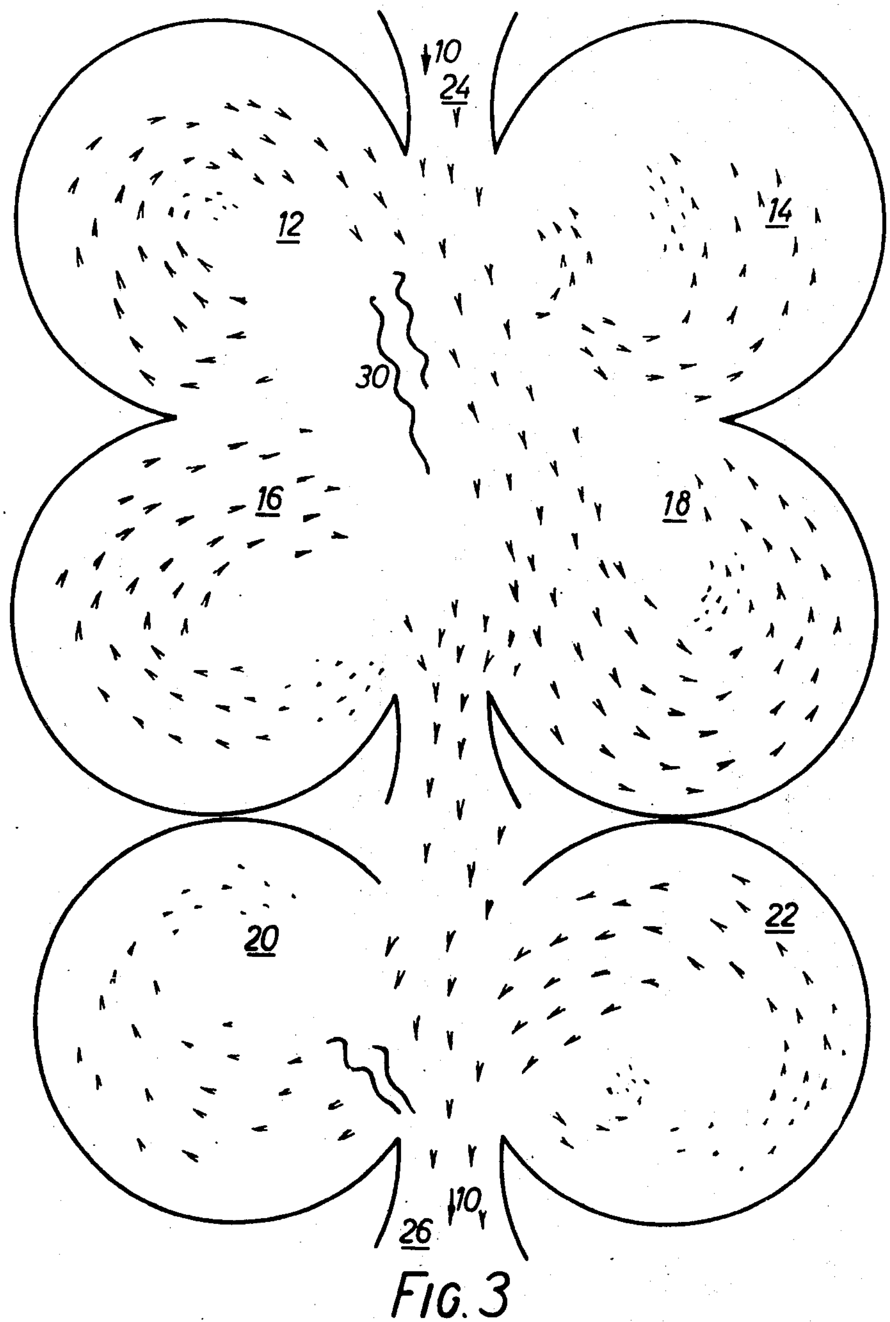
Figure 4:
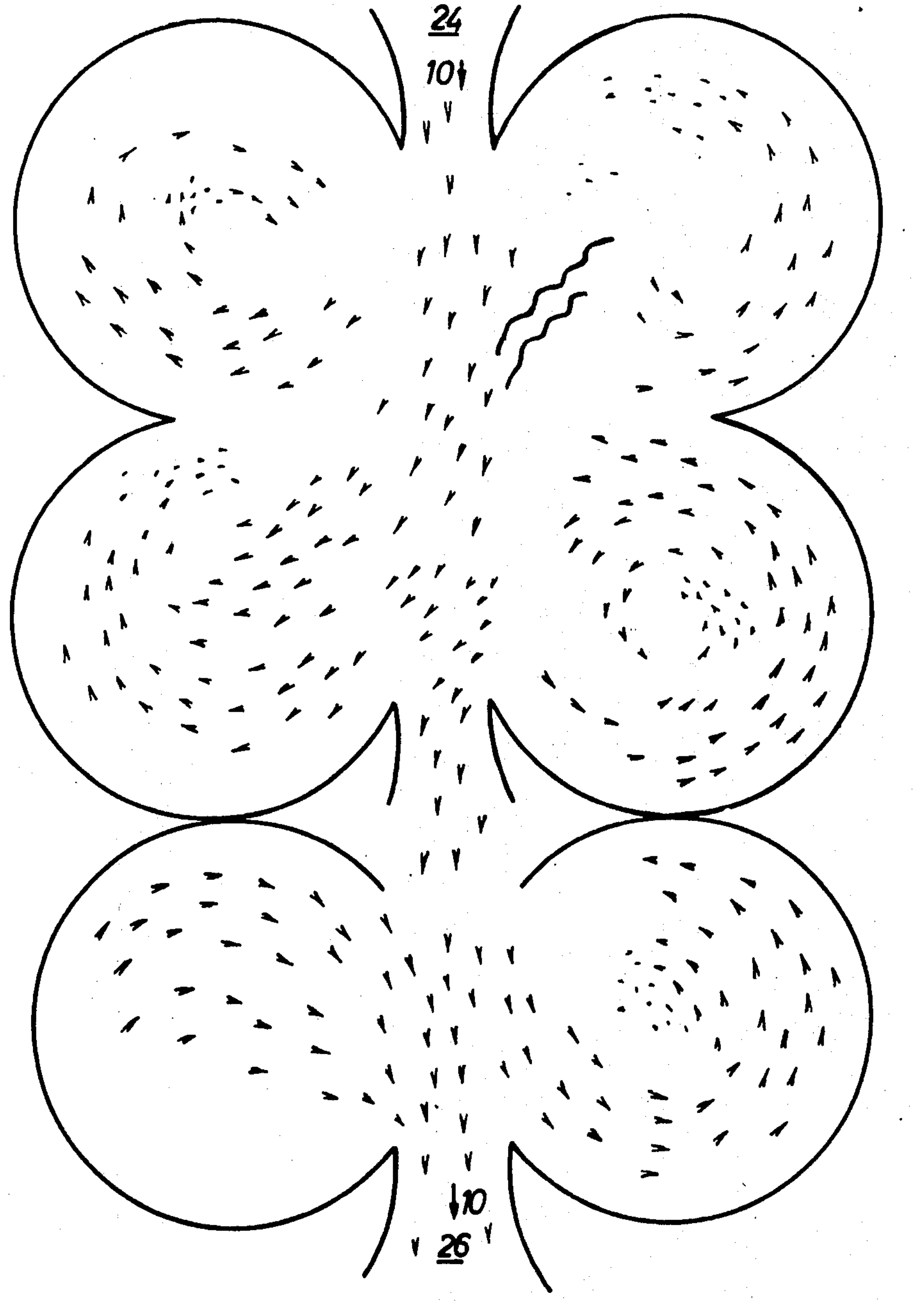

FIGS. 2–4 show an example of the combination of two elements, that is basins 12, 14 and basins 16, 18, where the movements have become entirely interrelated. If more than two elements are so combined then no oscillation takes place. FIG. 2 illustrates the condition when the bulk of the liquid flow has been diverted momentarily at a given point in time into the basin 16 as a result of the anti-clockwise circulation that is seen in the basins 14 and 18. FIG. 3 illustrates the situation that obtains a short period later, when the bulk of the flow has "switched" into the basin 18 setting up a strong anti-clockwise circulation therein. A wave whose peak is seen at 30 is formed as the water moves laterally out of the basin 16 against the incoming stream defining the start of the main path 10 as a result of the previous condition shown in FIG. 2. FIG. 4 shows a condition which may exist a short period still later, this condition being similar to that of FIG. 2. FIGS. 2–4 do not illustrate necessarily a closely related time sequence, but are based on photographs taken at different phases of the movement.

Observation shows that a rhythmic movement is set up, self-induced and self-maintained by the action of the flowing liquid, which in tests was water. The bulk flow oscillates between circulating in one basin and its opposed counterpart, with which the one basin constitutes an element.

The system illustrated induces self-stimulating oscillating movement in a liquid flowing freely down a gradient. The system can be used with water serving as a vehicle for a limited quantity of mineral and/or organic matter. It will be seen that the system in essence consists of a series of elements, the optimum number, size and shape of which will be determined according to the gradient, flow rate and liquid used and according to the end result desired, e.g., mixing of liquids, or oxygenation of water, etc.

The elements are usually connected to each other in such a manner that no liquid escapes, thus forming a continuous channel. The alternative narrowing and widening of the channel, symmetrical or in special circumstances asymmetrical induces and/or maintains the transverse or longitudinal oscillations that build up in the open (i.e., free surface) flowing liquid. The present invention is particularly applicable to water.

Each element preferably has a comparatively narrow inlet and outlet on its central longitudinal axis about which rounded basins are build. The correct relationship of dimensions, flow and gradient are chosen according to the desired function of the element.

Figure 5A:
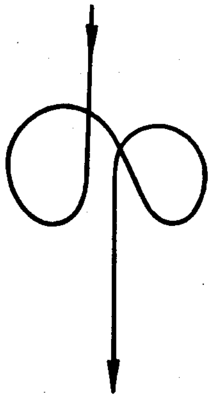
FIGS. 5*a* and 5*b* are respective diagrammatic illustrations of two momentarily stable flow conditions, these illustrations being helpful in understanding the function of one embodiment of the present invention.
Figure 5B:
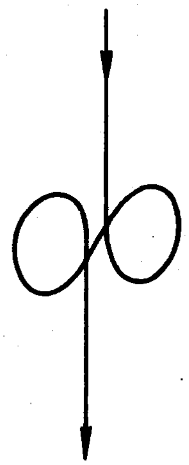

In any one particular embodiment of the invention, the main intention is that the apparatus is constructed to achieve a lemniscatory movement, which can also be described as a continuous oscillation of the flow pattern of the main flow between two momentarily stable conditions, illustrated schematically in plan view in FIGS. 5*a* and 5*b* respectively.

Figure 6:
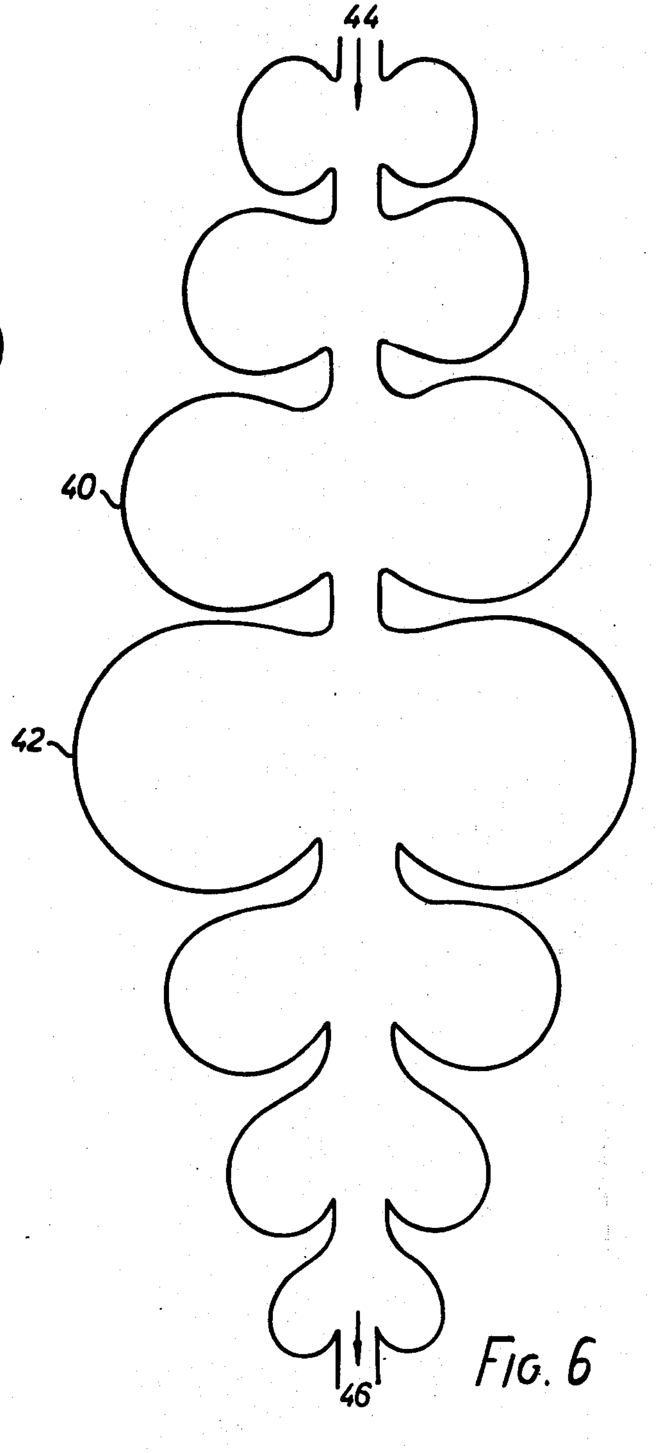
FIG. 6 is a somewhat diagrammatic, top, plan view of a second embodiment of an apparatus for treating a liquid constructed according to the present invention.

FIG. 6 shows, somewhat diagrammatically in top, plan view, an alternative embodiment of an apparatus according to the present invention in which the main flow path and the basins are defined by arcuate vertical walls 40 and 42. The basins gradually firstly increase and then decrease in area and volume, from an entrance 44 to an exit 46. The shape of the basins, as viewed in FIG. 6, varies from the entrance 44 end to the exit 46 end.

Figure 7:
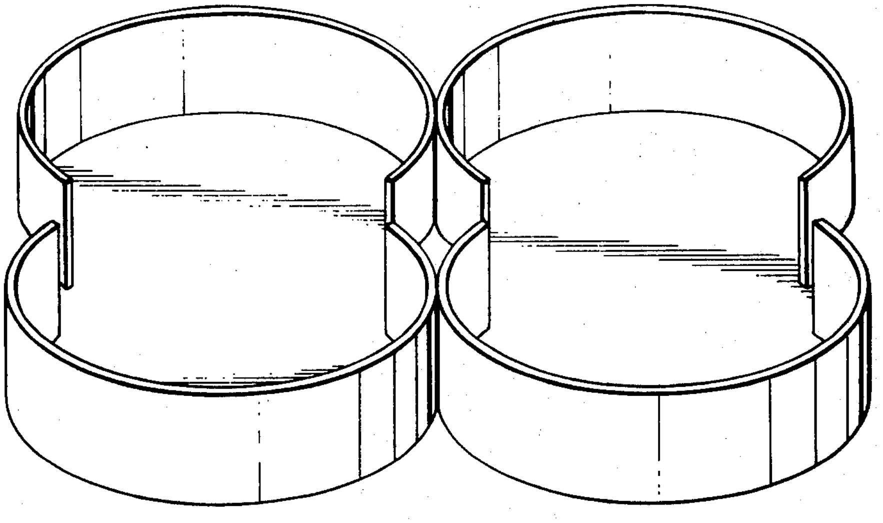
FIG. 7 is a perspective view of two elements which may be used in the apparatuses shown in FIGS. 1—4.
Figure 8:
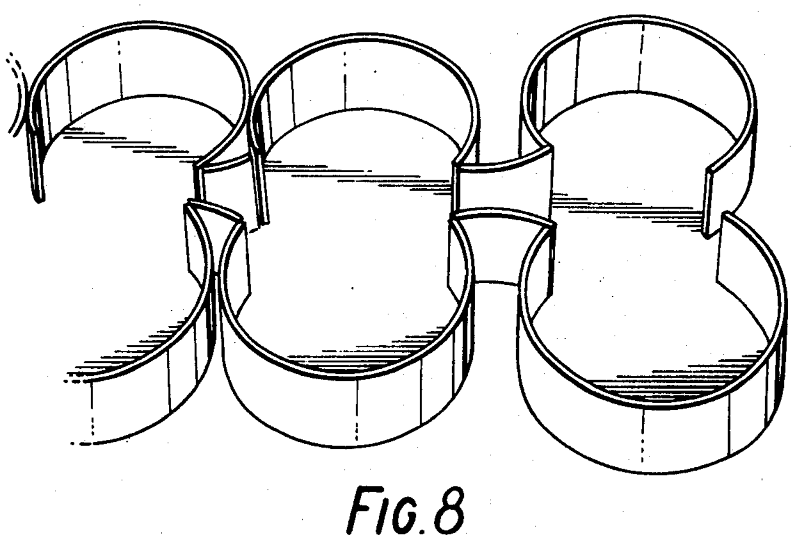
FIG. 8 is a perspective view of four elements, an additional element being partially visible, which may be partially visible, which may be used in the apparatuses shown in FIGS. 1–4.

FIGS. 7 and 8 show respective perspective views of two elements which can be used in the apparatus of FIG. 1. The type of element shown in FIGS. 7 and 8 is a basic type of element used for research purposes to study the method in detail. While the elements shown in FIG. 7 are in direct contact, those shown in FIG. 8 are connected to respective adjacent elements by channels formed by walls. The channel between such elements can be formed with arcuate or straight walls.

Figure 9:
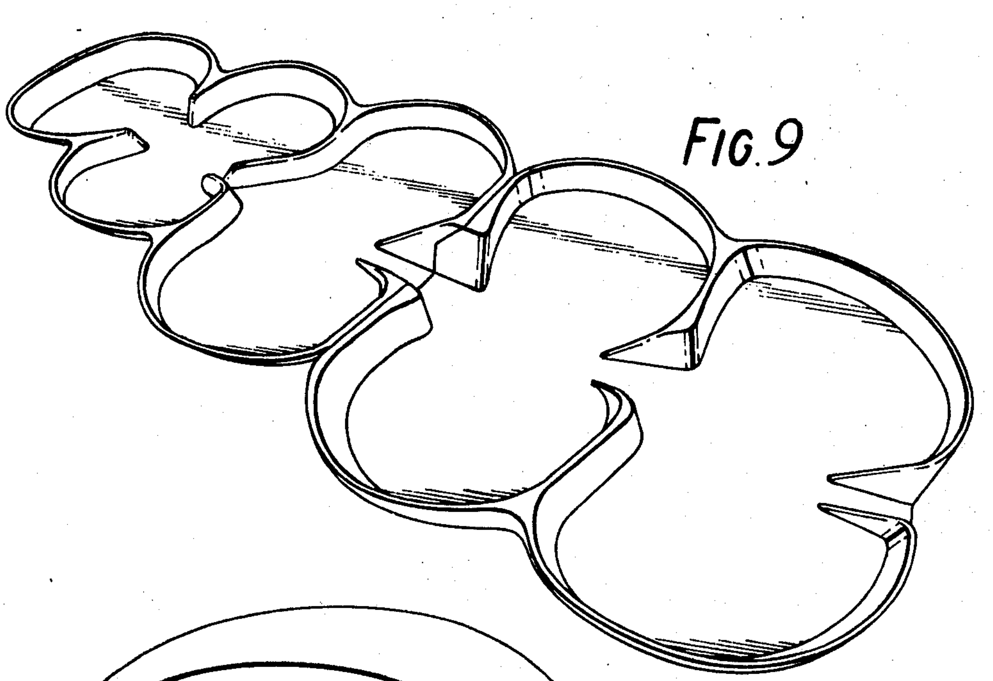
FIG. 9 is a perspective view of a series of five elements which constitutes a third embodiment of an apparatus for treating a liquid constructed in accordance with the present invention.

FIG. 9 is a perspective view of a series of elements made as a unit from a ceramic to define a series of five connected elements, continually increasing in size from one end of the apparatus to the other.

Figure 10:
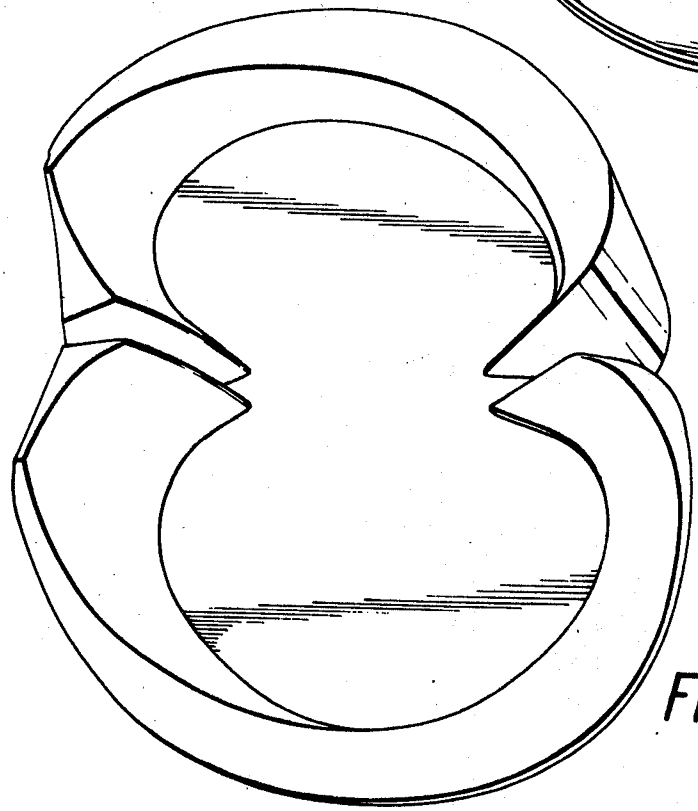
FIG. 10 is a perspective view of an embodiment of an individual element, made up of two basins.

FIG. 10 illustrates the design of an individual element made up of two basins. In this instance, the gradient may be sloping in either direction. These basins have sloping arcuate walls and can be combined in series either way round. The character of the movement of the liquid can also thus be varied.

Figure 11:
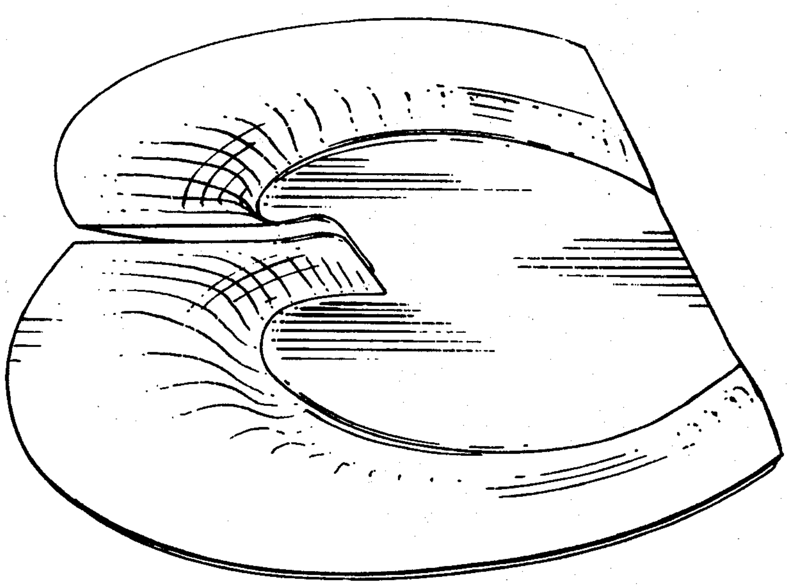
FIG. 11 is a perspective, partial view of yet another embodiment of an individual element, made of two basins.

FIG. 11 is a pespective view of a portion of an element having wide outwardly sloping arcuate walls over which the liquid spreads out into a film intermittently as it oscillates from left and right. On theoretical grounds, such arcuate walls may in special circumstances be made to conform to curves based on mathematical functions.

The elements of the apparatus according to the present invention can be fabricated, i.e., cast, pressed, blown, etc., by means of a process designed according to the medium used in fabrication i.e., concrete, artificial stone, resinated glass, plastics, metal etc., dependent upon the neutrality of the medium to the liquids and processes involved.

In each of the experimental models of elements illustrated above, proportions have to be brought into particular correspondence in order that the element is capable of stimulating the described oscillation.

Figure 12:
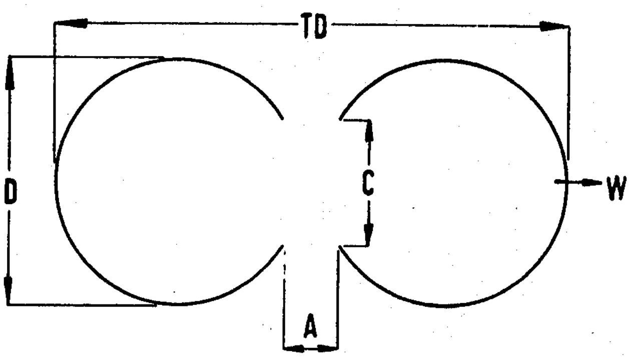
FIG. 12 is a somewhat schematic diagram of an illustrative element suitable for use in apparatuses constructed in accordance with the present invention, the diagram being helpful in designing such apparatuses.

The text below describes for a basic element the degree of variability available, reference being made to Table I and to FIG. 12 which is schematic, generalized illustration of an element constituted by two basins, positioned on opposite sides of the longitudinal axis of the apparatus.

Proportions of a Basic Type of Element

The following table derived from several hundred values gives a picture of the degree of variation in proportions for a basic type of element whereby lemniscatory movement of FIGS. 5*a* and 5*b* is induced; also shown is the most effective combination of proportions and gradient with given flow. Either side of the optimal combination the movement fades out.

Key to Terms and Letters

Element: a unit (see FIG. 12) consisting of two basins displaced either side of a channel with a common base. In the present instance, the simplest type of element is used, i.e., two equal cylindrical basins on a flat base (as in FIGS. 1, 7, and 8). As shown in FIG. 12,

- D designates the diameter of basin,
- H designates the height of basin,
- C constitutes the length of cord for a portion cut from a circular basin,
- F denominates the flow of liquid in liters/min.;
- A aperture between basins forming a parallel channel,
- G is the size of the gradient in cm/100,
- W is the difference between high and low points of a wave, taken at W,
- P designates the number of pendulling movement waves per minute, and
- TD is the maximum width of the element.

Variables

With the diameter D of the circular basin at 18.20 cm and the height H at 10 cm there are four variables:

1. the length of cord C removed from circular basin,
2. the aperture A between basins,
3. the flow F (water flows from reservoir with minimal pressure), and
4. the gradient G.

TABLE I

| | | | D 18.20 C 13.50 | | | | | H 10.00 | | | | |
|---|---|---|---|---|---|---|---|---|---|---|---|---|
| | | | F 18 | | | | | F 40 | | | | |
| G | A | | 0.5 | 1.0 | 2.0 | 3.0 | 4.0 | 0.5 | 1.0 | 2.0 | 3.0 | 4.0 |
| | P | | 70 | 62 | 53 | 48 | 41 | | 75 | 64 | 58 | 50 |
| 1.5 | W | | 0.4 | 0.9 | 1.4 | 0.5 | 0.3 | | 1.2 | 1.5 | 0.9 | 0.4 |
| 5.0 | W | BASINS | 1.2 | 1.5 | 1.7 | 0.9 | — | OVER- | 1.9 | 2.0 | 1.7 | 0.6 |
| 6.0 | W | FILL | 1.1 | 1.4 | 1.6 | 0.8 | — | FLOW | 2.0 | 2.6 | 1.9 | — |
| 9.0 | W | UP | 1.0 | 1.3 | 1.5 | 0.7 | — | | 2.4 | 2.9 | 2.1 | — |
| 12.0 | W | ↑ | 0.9 | 1.1 | 1.3 | 0.6 | — | | 1.8 | 2.3 | 1.7 | — |
| | | | BASIN EMPTY OUT | | | | → | | → | | | → |

Explanation of the Table I

All the values in the Table I are taken, using an element with basins where:

- D — 18.20 cm.,
- C — 13.50 cm.,
- H — 10.00 cm..

Two values of F are used, approx. 18 lt./min. and 40 lt./min. applying to the two blocks with the same series of values for G and A.

It is seen that number P of oscillations remains constant for a given aperture A even though the element fills up due to a decrease in G. The number P of oscillations however becomes faster as the element fills up due to a decrease in A.

Through the two values of W (high and low, not shown) used to calculate the W figure given, it is clearly evident that towards the small values of G and A (i.e., top left in each block) the basins fill up (and eventually overflow). On the other hand (bottom right) towards the larger values of G and A the basins empty out.

Towards the lower values of F the maximum wave difference is achieved with a shallower gradient, while towards the higher values of F the maximum is achieved with a steeper gradient. It seems however that the maximum wave difference is achieved at a constant aperture A, namely 2 cm. in this instance independent of gradient. Either side of this maximum, towards lower and higher values of A and G the wave difference diminishes.

This shows that a given set of values of D, C and F brings about one resulting maximum value for W where the element is most efficient. As F increases further that 40 lt./min. the element soon overflows or floods so strongly that all pendulling movement ceases.

Another set of values (not shown) where C is varied, shows that symmetrically either side the above value of C towards 11 and 16 respectively lemniscatory movement degenerates.

These results apply directly to larger values of D in relationship to larger values of F. As the value of D is progressively reduced, the lemniscatory movement soon degenerates. For more complicated and specialized designs derived from the basic element of FIG. 12, these results apply in principle.

The apparatus as per the invention may not only be used for purification of liquids, but also, with a more aesthetic effect, in municipal parks for public enjoyment.

In a preferred embodiment of the invention, the pairs of basins are connected by channels whose side walls are straight as seen looking down on them. The bottom of each basin may have curved, upright ribs so constructed that they produce the desired flow patterns or maintain the same. A rib may, e.g. be spiral. The vertical cross-section of a rib may be square, rectangular or curved.

Similarly, the connection channels between two pairs of basins may be provided with such ribs. The single rib may be symmetrical with respect to the main direction of flow and may rise in height somewhat in that direction. For example, the rib may be pyramidal, with the base of the pyramid being an acute, equilateral triangle whose angular bisector is parallel to the main direction of flow and whose apex lies upstream.

Another advantageous embodiment of the invention provides that each basin has a concave, bell-shaped indentation located in the middle region of, e.g., the bottom of the basin. Such indentations are preferably provided downstream of that zone in which the turbulence (vortex) periodically appears and vanishes.

The following example is important because it demonstrates how the invention may be used with a view to oxygen enrichment of water. An apparatus according to the invention uses e.g. pairs of basins extending for 10 meters between inlet and outlet. The height gradient between inlet and outlet may be 1 meter. At the inlet, the oxygen content of the water was measured to be 0.3 mg/liter. At the outlet, the oxygen content was already 6 mg/liter, i.e. a twenty-fold enrichment was obtained.

In that test, the stream had lemniscatory motion, as described above. When this lemniscatory motion was not induced, the same apparatus achieved no oxygen enrichment worth mentioning.

The foregoing description and accompanying drawing figures relate to illustrative embodiments of apparatuses according to the present invention provided by way of example, not by way of limitation. It is to be appreciated that numerous varients and other embodiments are possible within the spirit and scope of the invention, the scope being defined by the appended claims.

What is claimed is:

1. An apparatus for use in treating a liquid flowing therethrough under gravity, which comprises:

an entrance for liquid;

an exit for liquid; and means defining a total flow path having a general downhill gradient in a mean direction of flow from said entrance to said exit, which comprises at least one element which includes:

a bottom or floor surface;

at least one pair of arcuate-shaped basins as seen in top plan view, said basins of each pair of basins being oppositely and symmetrically disposed with respect to a main flow path through the element in said mean direction of flow as seen in top plan view, each basin having an arcuate side wall with an upstream end and a downstream end relative to said mean direction of flow, which define a side opening to the basin, for receiving a diverted portion of the liquid flowing along the main flow path at said downstream end, and changing the direction of flow of said portion as it swirls around the basin along a generally arcuate path under the guidance of the arcuate side wall so that said portion leaves the basin at the upstream end of the arcuate wall on a path which intersects the main flow path and laterally deflects liquid flowing in the main flow path towards an oppositely disposed basin;

an inlet for liquid defined by the upstream ends of the arcuate walls of the first pair of basins disposed downstream from said entrance;

an outlet for liquid defined by the downstream ends of the arcuate walls of the first pair of basins disposed upstream from said exit, said downstream ends also diverting a portion of the liquid flowing along the main flow path into said basins; and said main flow path through said element constituted by the shortest flow path between said inlet and said outlet;

whereby at least a portion of the liquid flowing through the element executes an oscillatory motion about the main flow path of the element by flowing into and out of the basins of the element when the rate of flow of liquid into the element is such as to allow a substantially free upper liquid surface in which waves can form to induce and maintain the oscillatory motion.

2. An apparatus for use in treating a liquid, as described in claim 1, wherein said at least one pair of basins consists of a single pair of basins, which is both the first pair of basins disposed downstream from said entrance, and the first pair of basins disposed upstream from said exit.

3. An apparatus for use in treating a liquid, as described in claim 1, wherein said at least one pair of basins consists of two pairs of basins, the downstream ends of the arcuate walls of the first pair of basins disposed downstream from said entrance being adjacent to corresponding upstream ends of the arcuate walls of the first pair of basins disposed upstream from said exit.

4. An apparatus for use in treating a liquid, as described in claim 1, wherein said arcuate walls are circular arcs, as seen in top plan view.

5. An apparatus for use in treating a liquid, as described in claim 1, wherein said arcuate walls have a straight, vertical profile.

6. An apparatus for use in treating a liquid, as described in claim 1, wherein said arcuate walls have a sloping profile.

7. An apparatus for use in treating a liquid, as described in claim 1, wherein said arcuate walls have a curved, outwardly sloping, profile.

8. An apparatus for use in treating a liquid, as described in claim 1, wherein the bottom of said element slopes downwardly from the inlet to the outlet of the element.

9. An apparatus for use in treating a liquid, as described in claim 1, wherein the bottom of said element is horizontally disposed.

10. An apparatus for use in treating a liquid, as described in claim 1, which comprises a plurality of said elements, connected in series by channels which each extend between the outlet of one element to the inlet of an adjacent, downstream element, each channel being defined by side walls extending between corresponding ends of the arcuate walls defining the outlet and inlet of said adjacent elements.

11. An apparatus for use in treating a liquid, as described in claim 10, wherein said channel side walls are straight, as seen in top plan view.

12. An apparatus for use in treating a liquid, as described in claim 10, wherein said channel side walls are arcuate, as seen in top plan view.

13. An apparatus for use in treating a liquid, as described in claim 10, wherein the plurality of elements comprise elements of different shapes and sizes.

14. An apparatus for use in treating a liquid, as described in claim 10, wherein the plurality of elements are of increasing size from said entrance to said exit.

15. An apparatus for use in treating a liquid, as described in claim 10, wherein the plurality of elements are of increasing size from said entrance toward said exit to a point along the total flow path and are of decreasing size from said point toward said exit.

* * * * *